Feb. 17, 1931.  W. A. MEYER  1,792,751
BELT SPLICE
Filed March 5, 1928

Inventor
W. A. Meyer
by [signature]
Attorney

Patented Feb. 17, 1931

1,792,751

UNITED STATES PATENT OFFICE

WALTER A. MEYER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE

BELT SPLICE

Application filed March 5, 1928. Serial No. 259,006.

This invention relates generally to improvements in the art of splicing power transmission belts in order to provide for continuity in the structures thereof.

An object of the invention is to provide a simple and conveniently applicable splice for producing a relatively durable union between the adjacent ends of transmission belts or the like. Another object of the invention is to provide a belt splice especially applicable to V-belts, which is capable of effectively resisting longitudinal tension and lateral flexing, without danger of destruction of the splice. A further object of the invention is to provide a belt splice especially applicable to elastic non-metallic driving belts, formed of material such as rubber composition. Still another object of the invention is to provide a splice which will not in any manner interfere with the normal operation of a belt to which the invention is applied. These and other objects and advantages of the present improvement, will be apparent from the following description.

A clear conception of several embodiments of the invention and of the manner of applying splices in accordance therewith, may be had by referring to the drawing accompanying and forming a part of this specification wherein like reference characters designate the same elements in the several views.

Figure 2:
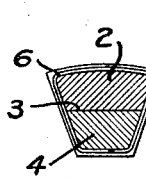
Fig. 2 is a transverse section through the spliced portion of a trapezoidal belt such as illustrated in Fig. 1.
Figure 1:
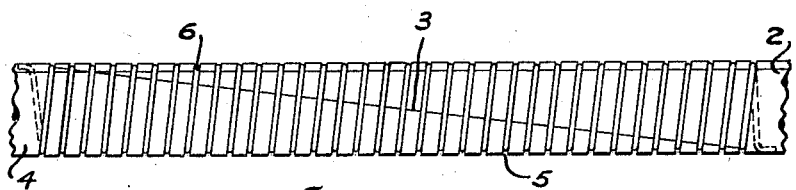
Fig. 1 is a side view of the spliced portion of a trapezoidal transmission belt, showing one mode of applying the improved splice.

Referring specifically to Figs. 1 and 2, the power transmission belt is of trapezoidal transverse cross section, being provided with oppositely disposed side driving surface and with overlapping adjoining ends 2, 4 which coact along a surface 3 extending diagonally across the belt from the top to the bottom thereof. The belt which may be formed of elastic material such as rubber composition, is provided with a spiral groove 5 within which is wound a cord or wire 6 preferably formed of metal or other material having relatively high tensile strength. The ends of the wire 6 may be passed transversely through the body of the belt as shown, in order to prevent unwinding of the wire, and the spiral groove 5 may either be formed in the belt prior to application of the wire 6, or it may be formed by tightly drawing the wire 6 against the elastic belt surfaces when wrapping the wire 6 about the belt.

Figure 4:
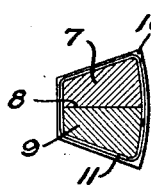
Fig. 4 is a transverse section through the spliced portion of the belt shown in Fig. 3.
Figure 3:
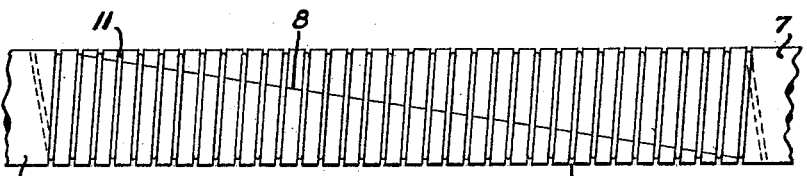
Fig. 3 is a side view of the spliced portion of a trapezoidal belt, showing another mode of applying the improved splice to such belts.

Referring specifically to Figs. 3 and 4, the belt is formed with opposite side driving surfaces and has ends 7, 9 provided with adjoining or abutting ends coacting along a surface 8 which extends transversely across the belt from one of the side driving surfaces to the other. The belt of this embodiment is likewise formed of elastic material such as rubber composition and is provided with a spiral groove 10 within which is located a cord or wire 11 of metal or the like, which retains the belt ends in intimate contact with each other. The advantage of this construction over that shown in Figs. 1 and 2, is that the normal driving pressure applied to the side driving surfaces of the belt assists the wire 11 in urging the belt ends into intimate engagement with each other.

Figure 6:
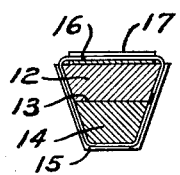
Fig. 6 is a transverse section through the spliced portion of the belt illustrated in Fig. 5.
Figure 5:
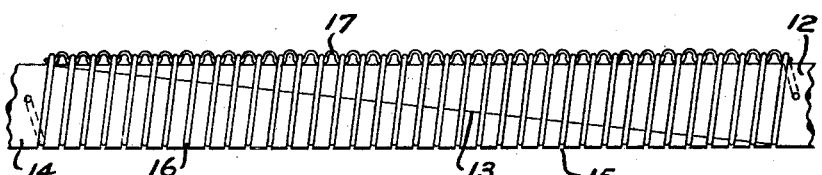
Fig. 5 is a side elevation of the spliced portion of a trapezoidal transmission belt, showing still another mode of applying one of the improved splices thereto.

In the embodiment of the invention illustrated in Figs. 5 and 6, the belt ends 12, 14 coact with each other along a common diagonal end plane 13, and the belt is provided with grooves 15 which cooperate with notches in a retainer 17 to produce a continuous spiral recess extending along the splice. The retaining wire 16 coacts with the grooves 15 and the notches of the element 17, to firmly clamp the overlapping ends 12, 14 of the belt together. The use of a spacing element 17 offers the advantage that no previous formation of the grooves 15 is necessary in order to insure application of the wire 16 in spiral fashion.

In each of the several embodiments illustrated, the cord or wire which is wrapped spirally about the overlapping ends of the belt, serves to intimately connect the belt ends by urging the coacting end surfaces thereof against each other. By virtue of the fact that the clamping cord or wire is embedded beneath the surface of the belt, the normal lateral compression and expansion of the belt during operation is not interfered with, and the driving surfaces while being slightly interrupted by the recesses in which the connecting element is disposed, are still substantially continuous and effective in performing their intended function. The retaining wire may be formed either of strong cord or wire, and may also be readily applied and attached to the belt in any convenient manner, without the use of special tools. When the splice is applied to rubber belts, the grooves need not to be formed prior to application of the wire, since the wire may be forced into the belt surface thereby forming its own confining groove. As previously stated, the splice of Figs. 3 and 4 offers the additional advantage that the belt ends are urged into intimate contact with each other during normal driving, and the splice of Figs. 5 and 6 offers the advantage of permitting proper and convenient application of the wire in the form of a spiral when the retaining groove is not previously formed. In each case, it is preferable to make the overlapping portions of the belt as long as possible in order to secure a splice of maximum strength and of relatively great flexibility.

In order to insure a firmer union between the coacting belt ends, these ends may be glued or vulcanized to each other prior to the application of the retaining cord or wire. The cord or wire will obviously assist the glue in performing its function of intimately uniting the belt ends. In case a fabric cord or gut is used instead of a metal wire, such cord or gut may likewise be coated with glue or cement prior to application thereof to the belt, thereby assisting the end fastenings in retaining the clamping element in position.

It should be understood that it is not desired to limit the invention to the exact details of construction herein shown and described for various modifications within the scope of the claims may occur to persons skilled in the art.

It is claimed and desired to secure by Letters Patent:

1. An article of manufacture comprising a power transmission belt having overlapping coacting ends interconnected by an elongated element wrapped about said ends and disposed entirely beneath the driving surfaces of said overlapping ends of the belt.

2. An article of manufacture comprising a power transmission belt of the side driving type having overlapping coacting ends, and means for holding said overlapping ends of the belt in interconnected relation, said means comprising a multiplicity of spaced elements surrounding said overlapping coacting ends and having the side portions thereof disposed wholly beneath the side driving surfaces of said overlapping end portions.

3. An article of manufacture comprising a power transmission belt of trapezoidal cross section provided with oppositely disposed side driving surfaces and having overlapping adjoining ends interconnected by an elongated element wrapped spirally about said overlapping ends and disposed entirely beneath the side driving surfaces thereof.

4. An article of manufacture comprising a power transmission belt having overlapping ends coacting along a surface extending diagonally across the belt, said belt ends being interconnected to prevent appreciable relatively longitudinal displacement thereof by an elongated element wrapped spirally thereabout and disposed entirely beneath the side driving surfaces thereof.

5. An article of manufacture comprising a power transmission belt formed of elastic material and having a substantially non-extensible splice formed by overlapping adjoining ends interconnected by an elongated element wrapped in the form of a plurality of spaced turns about said overlapped ends and disposed entirely beneath the driving surfaces of the belt.

6. An article of manufacture comprising a power transmission belt formed of rubber composition and having overlapping adjoining ends interconnected by a metal wire wrapped about said overlapping ends in a plurality of loops and disposed entirely beneath the driving surfaces of the overlapping ends of the belt.

7. An article of manufacture comprising a power transmission belt of trapezoidal cross section having side driving surfaces and formed of rubber composition, said belt having overlapping ends coacting along a surface extending diagonally across the belt, and said belt ends being interconnected to prevent appreciable relative longitudinal separation by a metal wire wrapped spirally thereabout and located so as to entirely avoid interference with normal functioning of said driving surfaces.

8. An article of manufacture comprising a power transmission belt of trapezoidal cross section having oppositely disposed side driving surfaces and formed of rubber composition, said belt having overlapping ends coacting along a surface extending diagonally across the belt from one of said driving surfaces to the other, and said belt ends being pressed into firm engagement to prevent appreciable relative longitudinal displacement during normal operation by an elongated element wrapped spirally in a plurality of turns about the overlapping portions of the belt and disposed wholly beneath the driving surfaces of said overlapping end portions.

9. An article of manufacture comprising a power transmission belt formed of elastic material and having overlapping ends coacting along a surface extending diagonally across the belt and of length greater than double the maximum width of the belt, said belt ends being interconnected throughout the length of said surface to prevent appreciable relative longitudinal displacement of said overlapping ends by an elongated element wrapped spirally thereabout and disposed entirely beneath the side driving surfaces of the belt.

10. In combination, a power transmission belt having overlapping coacting ends provided with external preformed grooves disposed spirally relative to the longitudinal axis of the belt and with a plurality of turns, and an elongated element disposed within said grooves entirely beneath the driving surface of said belt, the side driving walls of said grooves retaining the individual turns of said elongated element against appreciable displacement longitudinally of said belt ends.

11. In combination, a power transmission belt having overlapping coacting ends, means associated with the exterior of said belt to form a series of grooves extending transversely thereof, and a wire wrapped around said belt at said ends and coacting with said grooves.

In testimony whereof, the signature of the inventor is affixed hereto.

WALTER A. MEYER.